(12) United States Patent
Iga et al.

(10) Patent No.: US 9,272,578 B2
(45) Date of Patent: Mar. 1, 2016

(54) PNEUMATIC TIRE

(71) Applicant: The Yokohama Rubber Co., LTD., Minato-ku, Tokyo (JP)

(72) Inventors: Kohshi Iga, Hiratsuka (JP); Hideki Hamanaka, Hiratsuka (JP); Kouichi Koutoku, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/406,151

(22) PCT Filed: Jun. 7, 2013

(86) PCT No.: PCT/JP2013/065851
§ 371 (c)(1),
(2) Date: Dec. 5, 2014

(87) PCT Pub. No.: WO2014/010353
PCT Pub. Date: Jan. 16, 2014

(65) Prior Publication Data
US 2015/0136297 A1 May 21, 2015

(30) Foreign Application Priority Data

Jul. 13, 2012 (WO) .................. PCT/JP12/68025
Jul. 13, 2012 (WO) .................. PCT/JP12/68026
Jul. 13, 2012 (WO) .................. PCT/JP12/68027

(51) Int. Cl.
*B60C 9/18* (2006.01)
*B60C 9/22* (2006.01)
(Continued)

(52) U.S. Cl.
CPC ... *B60C 9/20* (2013.01); *B60C 3/04* (2013.01); *B60C 9/18* (2013.01); *B60C 9/2006* (2013.04);
(Continued)

(58) Field of Classification Search
CPC .............. B60C 9/18; B60C 9/20; B60C 9/22; B60C 9/2204; B60C 9/28
See application file for complete search history.

(56) References Cited

U.S. PATENT DOCUMENTS 4,398,582 A * 8/1983 Yuto et al. .................. 152/209.5
5,131,446 A * 7/1992 Fukumoto et al. ............ 152/532
(Continued)

FOREIGN PATENT DOCUMENTS

FR           1437569    * 5/1966
FR           1536110    * 8/1968
(Continued)

OTHER PUBLICATIONS

Machine translation of FR 1437569, 1966.*
(Continued)

*Primary Examiner* — Justin Fischer
(74) *Attorney, Agent, or Firm* — Thorpe North & Western

(57) ABSTRACT

In a pneumatic tire, a belt layer includes an inner-side cross belt and an outer-side cross belt each having an absolute value of a belt angle with respect to the tire circumferential direction of not less than 46 degrees and not more than 80 degrees and having the belt angles with signs that are opposite to each other. The circumferential reinforcing layer has a belt angle with respect to the tire circumferential direction within the range ±5 degrees and disposed between the inner-side cross belt and outer-side cross belt. The supplemental belt has an absolute value of a belt angle with respect to the tire circumferential direction of not less than 10 degrees and not more than 45 degrees, and is disposed on the inner side in the tire radial direction of the inner-side cross belt. The supplemental belt and the inner-side cross belt have belt angles with opposite signs.

16 Claims, 13 Drawing Sheets

(51) Int. Cl.
  *B60C 9/28* (2006.01)
  *B60C 9/20* (2006.01)
  *B60C 11/00* (2006.01)
  *B60C 11/13* (2006.01)
  *B60C 3/04* (2006.01)
  *B60C 11/03* (2006.01)

(52) U.S. Cl.
  CPC ............... *B60C 9/28* (2013.01); *B60C 11/0083* (2013.04); *B60C 11/03* (2013.01); *B60C 11/0306* (2013.04); *B60C 11/1392* (2013.04); *B60C 2009/2012* (2013.04); *B60C 2009/2016* (2013.04); *B60C 2009/2019* (2013.04); *B60C 2009/2022* (2013.04); *B60C 2009/2041* (2013.04); *B60C 2009/283* (2013.04); *Y10T 152/10801* (2015.01)

(56) References Cited

U.S. PATENT DOCUMENTS

| | | | |
|---|---|---|---|
| 8,146,637 | B2 | 4/2012 | Radulescu et al. |
| 8,225,835 | B2 * | 7/2012 | Harikae .............. B60C 9/2006 152/527 |
| 8,800,619 | B2 | 8/2014 | Yamaguchi et al. |
| 2006/0169381 | A1 | 8/2006 | Radulescu et al. |
| 2006/0169383 | A1 | 8/2006 | Radulescu et al. |
| 2014/0166178 | A1 | 6/2014 | Sato |
| 2014/0196826 | A1 | 7/2014 | Kobayashi |
| 2014/0305566 | A1 | 10/2014 | Mashiyama |

FOREIGN PATENT DOCUMENTS

| | | |
|---|---|---|
| JP | 2006111217 | 4/2006 |
| JP | 2006183211 | 7/2006 |
| JP | 2006528102 | 12/2006 |
| JP | 2006528103 | 12/2006 |
| JP | 2006528105 | 12/2006 |
| JP | 2009001092 | 1/2009 |
| JP | 4911267 | 4/2012 |
| JP | 4918948 | 4/2012 |
| JP | 4952864 | 6/2012 |
| JP | 4973810 | 7/2012 |
| WO | 2010041720 | 4/2010 |
| WO | 2013021499 | 2/2013 |

OTHER PUBLICATIONS

International Search Report for International Application No. PCT/JP2013/065851 dated Jul. 9, 2013, 3 pages, Japan.

* cited by examiner

| | CONVENTIONAL EXAMPLE | COMPARATIVE EXAMPLE | WORKING EXAMPLE 1 | WORKING EXAMPLE 2 | WORKING EXAMPLE 3 | WORKING EXAMPLE 4 |
|---|---|---|---|---|---|---|
| PRESENCE OF CIRCUMFERENTIAL REINFORCING LAYER | YES | Yes | YES | YES | YES | YES |
| POSITION OF THE CIRCUMFERENTIAL REINFORCING LAYER WITH RESPECT TO THE CROSS BELTS | BETWEEN | BETWEEN | BETWEEN | BETWEEN | BETWEEN | BETWEEN |
| BELT ANGLE OF CROSS BELTS (degrees) | 20 | 20 | 46 | 60 | 80 | 60 |
| PRESENCE OF SUPPLEMENTAL BELT | YES | YES | YES | YES | YES | YES |
| POSITION OF SUPPLEMENTAL BELT WITH RESPECT TO THE CROSS BELTS | OUTER SIDE | INNER SIDE | INNER SIDE | INNER SIDE | INNER SIDE | INNER SIDE |
| BELT ANGLE OF SUPPLEMENTAL BELT (degrees) | 20 | 20 | 20 | 20 | 20 | 20 |
| ORIENTATION OF BELT ANGLE OF SUPPLEMENTAL BELT AND ADJACENT CROSS BELT | SAME SIGN | SAME SIGN | OPPOSITE SIGN | OPPOSITE SIGN | OPPOSITE SIGN | OPPOSITE SIGN |
| PRESENCE OF HIGH ANGLE BELT | YES | NONE | None | NONE | NONE | NONE |
| Wb4/Wb2 | 0.70 | 0.74 | 0.50 | 0.50 | 0.50 | 0.75 |
| END COUNT OF SUPPLEMENTAL BELT (No./50 mm) | 14 | 14 | 14 | 14 | 14 | 14 |
| Yc/Ya | 0.79 | 0.79 | 0.79 | 0.79 | 0.79 | 0.79 |
| Yd/Ya | 0.94 | 0.94 | 0.94 | 0.94 | 0.94 | 0.94 |
| Ws/Wca | 0.59 | 0.59 | 0.59 | 0.59 | 0.59 | 0.59 |
| Wb2/Wca | 0.73 | 0.73 | 0.73 | 0.73 | 0.73 | 0.73 |
| BREAKING ELONGATION OF TREAD RUBBER (%) | 390 | 390 | 390 | 390 | 390 | 390 |
| DISPOSITION STRUCTURE OF SUPPLEMENTAL BELT | CONTINUOUS STRUCTURE | CONTINUOUS STRUCTURE | CONTINUOUS STRUCTURE | CONTINUOUS STRUCTURE | CONTINUOUS STRUCTURE | CONTINUOUS STRUCTURE |
| Wb4 SD/WS | - | - | - | - | - | - |
| E4 sp/E2 | 0.89 | 0.89 | 0.89 | 0.89 | 0.89 | 0.89 |
| TW/Wca | 0.93 | 0.93 | 0.93 | 0.93 | 0.93 | 0.93 |
| GROOVE CRACKING RESISTANCE | 100 | 101 | 107 | 109 | 107 | 110 |

FIG. 8A

| | WORKING EXAMPLE 5 | WORKING EXAMPLE 6 | WORKING EXAMPLE 7 | WORKING EXAMPLE 8 | WORKING EXAMPLE 9 |
|---|---|---|---|---|---|
| PRESENCE OF CIRCUMFERENTIAL REINFORCING LAYER | YES | YES | YES | YES | YES |
| POSITION OF THE CIRCUMFERENTIAL REINFORCING LAYER WITH RESPECT TO THE CROSS BELTS | BETWEEN | Between | BETWEEN | Between | BETWEEN |
| BELT ANGLE OF CROSS BELTS (degrees) | 60 | 60 | 60 | 60 | 60 |
| PRESENCE OF SUPPLEMENTAL BELT | YES | YES | YES | YES | YES |
| POSITION OF SUPPLEMENTAL BELT WITH RESPECT TO THE CROSS BELTS | INNER SIDE | INNER SIDE | INNER SIDE | INNER SIDE | INNER SIDE |
| BELT ANGLE OF SUPPLEMENTAL BELT (degrees) | 20 | 20 | 20 | 20 | 20 |
| ORIENTATION OF BELT ANGLE OF SUPPLEMENTAL BELT AND ADJACENT CROSS BELT | OPPOSITE SIGN | OPPOSITE SIGN | OPPOSITE SIGN | OPPOSITE SIGN | OPPOSITE SIGN |
| PRESENCE OF HIGH ANGLE BELT | NONE | NONE | NONE | NONE | NONE |
| $Wb4/Wb2$ | 0.85 | 0.95 | 0.85 | 0.85 | 0.85 |
| END COUNT OF SUPPLEMENTAL BELT (No./50 mm) | 14 | 14 | 15 | 20 | 25 |
| $Yc/Ya$ | 0.79 | 0.79 | 0.79 | 0.79 | 0.79 |
| $Yd/Ya$ | 0.94 | 0.94 | 0.94 | 0.94 | 0.94 |
| $Ws/Wca$ | 0.59 | 0.59 | 0.59 | 0.59 | 0.59 |
| $Wb2/Wca$ | 0.73 | 0.73 | 0.73 | 0.73 | 0.73 |
| BREAKING ELONGATION OF TREAD RUBBER (%) | 390 | 390 | 390 | 390 | 390 |
| DISPOSITION STRUCTURE OF SUPPLEMENTAL BELT | CONTINUOUS STRUCTURE | CONTINUOUS STRUCTURE | CONTINUOUS STRUCTURE | CONTINUOUS STRUCTURE | CONTINUOUS STRUCTURE |
| $Wb4$ SD/WS | - | - | - | - | - |
| $E4$ sp/$E2$ | 0.89 | 0.89 | 0.89 | 0.89 | 0.89 |
| $Tw/Wca$ | 0.93 | 0.93 | 0.93 | 0.93 | 0.93 |
| GROOVE CRACKING RESISTANCE | 111 | 110 | 112 | 113 | 112 |

FIG. 8B

| | WORKING EXAMPLE 10 | WORKING EXAMPLE 11 | WORKING EXAMPLE 12 | WORKING EXAMPLE 13 | WORKING EXAMPLE 14 | WORKING EXAMPLE 15 |
|---|---|---|---|---|---|---|
| PRESENCE OF CIRCUMFERENTIAL REINFORCING LAYER | YES | YES | YES | YES | YES | YES |
| POSITION OF THE CIRCUMFERENTIAL REINFORCING LAYER WITH RESPECT TO THE CROSS BELTS | BETWEEN | BETWEEN | BETWEEN | BETWEEN | BETWEEN | BETWEEN |
| BELT ANGLE OF CROSS BELTS (degrees) | 60 | 60 | 60 | 60 | 60 | 60 |
| PRESENCE OF SUPPLEMENTAL BELT | YES | YES | YES | YES | YES | YES |
| POSITION OF SUPPLEMENTAL BELT WITH RESPECT TO THE CROSS BELTS | INNER SIDE | INNER SIDE | INNER SIDE | INNER SIDE | INNER SIDE | INNER SIDE |
| BELT ANGLE OF SUPPLEMENTAL BELT (degrees) | 20 | 20 | 20 | 20 | 20 | 20 |
| ORIENTATION OF BELT ANGLE OF SUPPLEMENTAL BELT AND ADJACENT CROSS BELT | OPPOSITE SIGN | OPPOSITE SIGN | OPPOSITE SIGN | OPPOSITE SIGN | OPPOSITE SIGN | OPPOSITE SIGN |
| PRESENCE OF HIGH ANGLE BELT | NONE | NONE | NONE | NONE | NONE | NONE |
| Wb4/Wb2 | 0.85 | 0.85 | 0.85 | 0.85 | 0.85 | 0.85 |
| END COUNT OF SUPPLEMENTAL BELT (No./50 mm) | 20 | 20 | 20 | 20 | 20 | 20 |
| Ye/Ya | 0.80 | 0.85 | 0.90 | 0.85 | 0.85 | 0.85 |
| Yd/Ya | 0.94 | 0.94 | 0.94 | 0.95 | 0.97 | 1.00 |
| Ws/Wca | 0.59 | 0.59 | 0.59 | 0.59 | 0.59 | 0.59 |
| Wb2/Wca | 0.73 | 0.73 | 0.73 | 0.73 | 0.73 | 0.73 |
| BREAKING ELONGATION OF TREAD RUBBER (%) | 390 | 390 | 390 | 390 | 390 | 390 |
| DISPOSITION CONFIGURATION OF SUPPLEMENTAL BELT | CONTINUOUS STRUCTURE | CONTINUOUS STRUCTURE | CONTINUOUS STRUCTURE | CONTINUOUS STRUCTURE | CONTINUOUS STRUCTURE | CONTINUOUS STRUCTURE |
| Wb4 SD/WS | - | - | - | - | - | - |
| E4_sp/E2 | 0.89 | 0.89 | 0.89 | 0.89 | 0.89 | 0.89 |
| TW/Wca | 0.93 | 0.93 | 0.93 | 0.93 | 0.93 | 0.93 |
| GROOVE CRACKING RESISTANCE | 114 | 115 | 114 | 116 | 117 | 116 |

FIG. 9A

| | WORKING EXAMPLE 16 | WORKING EXAMPLE 17 | WORKING EXAMPLE 18 | WORKING EXAMPLE 19 | WORKING EXAMPLE 20 | WORKING EXAMPLE 21 |
|---|---|---|---|---|---|---|
| PRESENCE OF CIRCUMFERENTIAL REINFORCING LAYER | YES | YES | YES | YES | YES | YES |
| POSITION OF THE CIRCUMFERENTIAL REINFORCING LAYER WITH RESPECT TO THE CROSS BELTS | BETWEEN | BETWEEN | BETWEEN | BETWEEN | BETWEEN | BETWEEN |
| BELT ANGLE OF CROSS BELTS (degrees) | 60 | 60 | 60 | 60 | 60 | 60 |
| PRESENCE OF SUPPLEMENTAL BELT | YES | YES | YES | YES | YES | YES |
| POSITION OF SUPPLEMENTAL BELT WITH RESPECT TO THE CROSS BELTS | INNER SIDE | INNER SIDE | INNER SIDE | INNER SIDE | INNER SIDE | INNER SIDE |
| BELT ANGLE OF SUPPLEMENTAL BELT (degrees) | 20 | 20 | 20 | 20 | 20 | 20 |
| ORIENTATION OF BELT ANGLE OF SUPPLEMENTAL BELT AND ADJACENT CROSS BELT | OPPOSITE SIGN | OPPOSITE SIGN | OPPOSITE SIGN | OPPOSITE SIGN | OPPOSITE SIGN | OPPOSITE SIGN |
| PRESENCE OF HIGH ANGLE BELT | NONE | NONE | NONE | NONE | NONE | NONE |
| Wb4/Wb2 | 0.85 | 0.85 | 0.85 | 0.85 | 0.85 | 0.85 |
| END COUNT OF SUPPLEMENTAL BELT (No./50 mm) | 20 | 20 | 20 | 20 | 20 | 20 |
| Yc/Ya | 0.85 | 0.85 | 0.85 | 0.85 | 0.85 | 0.85 |
| Yd/Ya | 0.97 | 0.97 | 0.97 | 0.97 | 0.97 | 0.97 |
| Ws/Wca | 0.60 | 0.65 | 0.70 | 0.65 | 0.65 | 0.65 |
| Wb2/Wca | 0.73 | 0.73 | 0.73 | 0.74 | 0.82 | 0.89 |
| BREAKING ELONGATION OF TREAD RUBBER (%) | 390 | 390 | 390 | 390 | 390 | 390 |
| DISPOSITION CONFIGURATION OF SUPPLEMENTAL BELT | CONTINUOUS STRUCTURE | CONTINUOUS STRUCTURE | CONTINUOUS STRUCTURE | CONTINUOUS STRUCTURE | CONTINUOUS STRUCTURE | CONTINUOUS STRUCTURE |
| Wb4 SD/WS | - | - | - | - | - | - |
| E4_sp/E2 | 0.89 | 0.89 | 0.89 | 0.89 | 0.89 | 0.89 |
| TW/Wca | 0.93 | 0.93 | 0.93 | 0.93 | 0.93 | 0.93 |
| GROOVE CRACKING RESISTANCE | 118 | 119 | 118 | 120 | 121 | 120 |

FIG. 9B

| | WORKING EXAMPLE 22 | WORKING EXAMPLE 23 | WORKING EXAMPLE 24 | WORKING EXAMPLE 25 | WORKING EXAMPLE 26 |
|---|---|---|---|---|---|
| PRESENCE OF CIRCUMFERENTIAL REINFORCING LAYER | YES | YES | YES | YES | YES |
| POSITION OF THE CIRCUMFERENTIAL REINFORCING LAYER WITH RESPECT TO THE CROSS BELTS | BETWEEN | BETWEEN | BETWEEN | BETWEEN | BETWEEN |
| BELT ANGLE OF CROSS BELTS (degrees) | 60 | 60 | 60 | 60 | 60 |
| PRESENCE OF SUPPLEMENTAL BELT | YES | YES | YES | YES | YES |
| POSITION OF SUPPLEMENTAL BELT WITH RESPECT TO THE CROSS BELTS | INNER SIDE | INNER SIDE | INNER SIDE | INNER SIDE | INNER SIDE |
| BELT ANGLE OF SUPPLEMENTAL BELT (degrees) | 20 | 20 | 20 | 20 | 20 |
| ORIENTATION OF BELT ANGLE OF SUPPLEMENTAL BELT AND ADJACENT CROSS BELT | OPPOSITE SIGN | OPPOSITE SIGN | OPPOSITE SIGN | OPPOSITE SIGN | OPPOSITE SIGN |
| PRESENCE OF HIGH ANGLE BELT | NONE | NONE | NONE | NONE | NONE |
| Wb4/Wb2 | 0.85 | 0.85 | 0.85 | 0.85 | 0.85 |
| END COUNT OF SUPPLEMENTAL BELT (No./50 mm) | 20 | 20 | 20 | 20 | 20 |
| Yc/Ya | 0.85 | 0.85 | 0.85 | 0.85 | 0.85 |
| Yd/Ya | 0.97 | 0.97 | 0.97 | 0.97 | 0.97 |
| Ws/Wca | 0.65 | 0.65 | 0.65 | 0.65 | 0.65 |
| Wb2/Wca | 0.82 | 0.82 | 0.82 | 0.82 | 0.82 |
| BREAKING ELONGATION OF TREAD RUBBER (%) | 400 | 450 | 500 | 500 | 500 |
| DISPOSITION CONFIGURATION OF SUPPLEMENTAL BELT | CONTINUOUS STRUCTURE | CONTINUOUS STRUCTURE | CONTINUOUS STRUCTURE | SPLIT STRUCTURE | SPLIT STRUCTURE |
| Wb4 SD/WS | - | - | - | 0.20 | 0.50 |
| E4_sp/E2 | 0.89 | 0.89 | 0.89 | 0.89 | 0.89 |
| TW/Wca | 0.93 | 0.93 | 0.93 | 0.93 | 0.93 |
| GROOVE CRACKING RESISTANCE | 122 | 123 | 122 | 124 | 125 |

FIG. 10A

| | WORKING EXAMPLE 27 | WORKING EXAMPLE 28 | WORKING EXAMPLE 29 | WORKING EXAMPLE 30 |
|---|---|---|---|---|
| PRESENCE OF CIRCUMFERENTIAL REINFORCING LAYER | YES | YES | YES | YES |
| POSITION OF THE CIRCUMFERENTIAL REINFORCING LAYER WITH RESPECT TO THE CROSS BELTS | BETWEEN | BETWEEN | BETWEEN | BETWEEN |
| BELT ANGLE OF CROSS BELTS (degrees) | 60 | 60 | 60 | 60 |
| PRESENCE OF SUPPLEMENTAL BELT | YES | YES | YES | YES |
| POSITION OF SUPPLEMENTAL BELT WITH RESPECT TO THE CROSS BELTS | INNER SIDE | INNER SIDE | INNER SIDE | INNER SIDE |
| BELT ANGLE OF SUPPLEMENTAL BELT (degrees) | 20 | 20 | 20 | 20 |
| ORIENTATION OF BELT ANGLE OF SUPPLEMENTAL BELT AND ADJACENT CROSS BELT | OPPOSITE SIGN | OPPOSITE SIGN | OPPOSITE SIGN | OPPOSITE SIGN |
| PRESENCE OF HIGH ANGLE BELT | NONE | NONE | NONE | NONE |
| Wb4/Wb2 | 0.85 | 0.85 | 0.85 | 0.85 |
| END COUNT OF SUPPLEMENTAL BELT (No./50 mm) | 20 | 20 | 20 | 20 |
| Yc/Ya | 0.85 | 0.85 | 0.85 | 0.85 |
| Yd/Ya | 0.97 | 0.97 | 0.97 | 0.97 |
| Ws/Wca | 0.65 | 0.65 | 0.65 | 0.65 |
| Wb2/Wca | 0.82 | 0.82 | 0.82 | 0.82 |
| BREAKING ELONGATION OF TREAD RUBBER (%) | 500 | 500 | 500 | 500 |
| DISPOSITION CONFIGURATION OF SUPPLEMENTAL BELT | SPLIT STRUCTURE | SPLIT STRUCTURE | SPLIT STRUCTURE | SPLIT STRUCTURE |
| Wb4 SD/WS | 0.80 | 0.50 | 0.50 | 0.50 |
| E4_sp/E2 | 0.89 | 1.10 | 1.10 | 1.10 |
| TW/Wca | 0.93 | 0.93 | 0.91 | 0.82 |
| GROOVE CRACKING RESISTANCE | 124 | 126 | 127 | 128 |

FIG. 10B

PNEUMATIC TIRE

TECHNICAL FIELD

The present technology relates to a pneumatic tire, and more particularly relates to a pneumatic tire that can improve the tire groove cracking resistance.

BACKGROUND

Heavy duty tires with low aspect ratios mounted on trucks, buses and the like demonstrate reduction of tire radial growth in the center region, and demonstrate uniformity of contact pressure distribution in the tire width direction, due to the disposition of a circumferential reinforcing layer in the belt layer. Conventional pneumatic tires that are configured in this manner are disclosed in Japanese Patent Nos. 4642760B, 4663638B and 4663639B, as well as Japanese Unexamined Patent Application Publication Nos. 2009-1092A, 2006-111217A and 2006-183211A.

However, there is a problem in that groove cracking resistance of the pneumatic tires needs to be improved.

SUMMARY

The present technology provides a pneumatic tire having a circumferential reinforcing layer whereby groove cracking resistance can be improved.

A pneumatic tire according to the present technology includes: a carcass layer; a belt layer disposed on an outer side of the carcass layer in a tire radial direction; tread rubber disposed on the outer side of the belt layer in the tire radial direction; at least three circumferential main grooves extending in a tire circumferential direction; and a plurality of land portions partitioned by the circumferential main grooves, the belt layer including an outer-side cross belt and an inner-side cross belt each having an absolute value of a belt angle of not less than 46 degrees and not more than 80 degrees and having the belt angles with signs that are opposite to each other; a circumferential reinforcing layer having a belt angle with respect to the tire circumferential direction in a range of ±5 degrees, and disposed between the inner-side cross belt and the outer-side cross belt; and an supplemental belt having an absolute value of a belt angle of not less than 10 degrees and not more than 45 degrees, and disposed on an inner side in the tire radial direction of the inner-side cross belt, and the supplemental belt and the inner-side cross belt having belt angles with signs that are opposite to each other.

In the pneumatic tire according to the present technology, the pair of cross belts 142, 143 function as a high angle belt, maintaining the stiffness in the tire width direction. Also, the circumferential reinforcing layer 145 and the supplemental belt 144 function as a low angle belt, maintaining the stiffness in the tire circumferential direction. In this way, the balance of stiffness in the tire circumferential direction and the tire width direction are appropriately adjusted, which has the advantage that the tire groove cracking resistance is improved. Also, the tire durability is maintained.

BRIEF DESCRIPTION OF THE DRAWING(S)

FIGS. 8A-8B include a table showing results of performance testing of pneumatic tires according to embodiments of the present technology.

FIGS. 9A-9B include a table showing results of performance testing of pneumatic tires according to embodiments of the present technology.

FIGS. 10A-10B include a table showing results of performance testing of pneumatic tires according to embodiments of the present technology.

DETAILED DESCRIPTION

The present technology is described below in detail with reference to the accompanying drawings. However, the present technology is not limited to these embodiments. Moreover, constituents which can possibly or obviously be substituted while maintaining consistency with the present technology are included in constitutions of the embodiments. Furthermore, a plurality of modified examples that are described in the embodiment can be freely combined within a scope of obviousness for a person skilled in the art.

[Pneumatic Tire]

Figure 1:
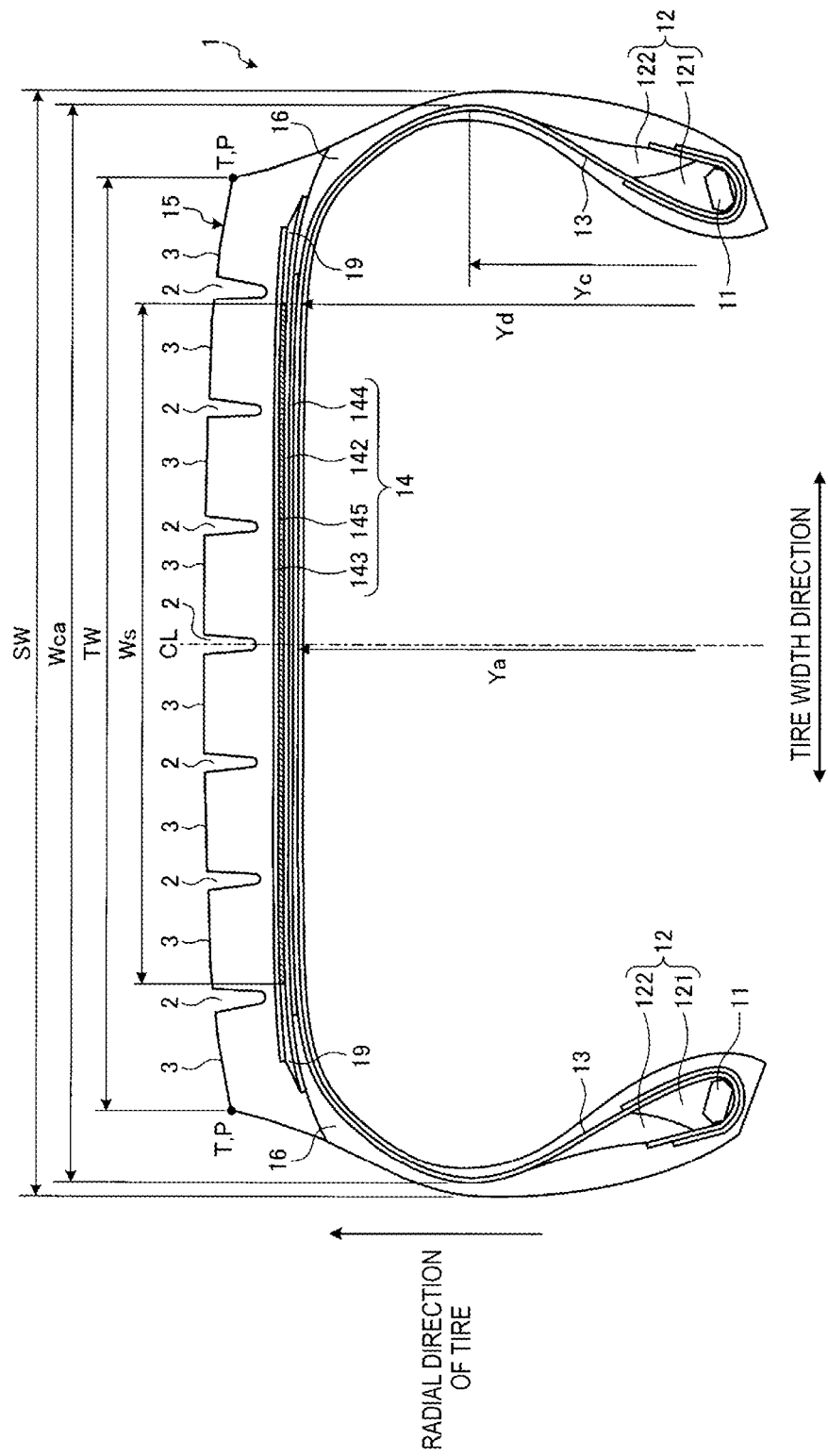
FIG. 1 is a cross-sectional view in a tire meridian direction illustrating a pneumatic tire according to an embodiment of the present technology.

FIG. 1 is a cross-sectional view in a tire meridian direction illustrating a pneumatic tire according to an embodiment of the present technology. In this drawing, a radial tire for heavy loads that is mounted on trucks, buses, and the like for long-distance transport is illustrated as an example of the pneumatic tire 1. Note that the symbol CL refers to a tire equator plane. Moreover, a tread edge P and a tire ground contact edge T are in accord with each other in FIG. 1. The circumferential reinforcing layer 145 in FIG. 1 is indicated by hatching.

A pneumatic tire 1 includes a pair of bead cores 11,11, a pair of bead fillers 12,12, a carcass layer 13, a belt layer 14, tread rubber 15, and a pair of side wall rubbers 16,16 (see FIG. 1).

The pair of bead cores 11,11 have annular structures and constitute cores of left and right bead portions. The pair of bead fillers 12,12 are formed from a lower filler 121 and an upper filler 122, and are disposed on a periphery of each of the pair of bead cores 11,11 in the tire radial direction so as to reinforce the bead portions.

The carcass layer 13 stretches between the left and right side bead cores 11 and 11 in toroidal form, forming a framework for the tire. Additionally, both ends of the carcass layer 13 are folded from an inner side in a tire width direction toward an outer side in the tire width direction and fixed so as to wrap around the bead cores 11 and the bead fillers 12. Also, the carcass layer 13 is constituted by a plurality of carcass cords formed from steel or organic fibers (e.g. nylon, polyester, rayon, or the like) covered by a coating rubber and subjected to a rolling process, and has a carcass angle (inclination angle of the carcass cord in a fiber direction with respect to the tire circumferential direction), as an absolute value, of not less than 85° and not more than 95°.

The belt layer 14 is formed by laminating a plurality of belt plies 142, 143, 144, 145, and disposed to extend over a periphery of the carcass layer 13. A detailed configuration of the belt layer 14 is described below.

The tread rubber 15 is disposed on an outer circumference in the tire radial direction of the carcass layer 13 and the belt layer 14, and forms a tread portion of the tire. The pair of side wall rubbers 16,16 is disposed on each outer side of the carcass layer 13 in the tire width direction, so as to form left and right sidewall portions of the tire.

In the configuration illustrated in FIG. 1, the pneumatic tire 1 includes seven circumferential main grooves 2 that extend in a tire circumferential direction, and eight land portions 3 partitioned and formed by the circumferential main grooves 2. Also, each of the land portions 3 are formed of a row of blocks that are segmented in the circumferential direction by ribs or a plurality of lug grooves that continue in the tire circumferential direction (not shown).

"Circumferential main grooves" refers herein to circumferential grooves having a groove width of 5.0 mm or greater. The groove widths of the circumferential main grooves are measured excluding notched portions and/or chamfered portions formed at the groove opening portion.

Furthermore, in the pneumatic tire 1, the circumferential main grooves 2, 2 on the left and right sides on the outermost side in the tire width direction are referred to as the outermost circumferential main grooves. Moreover, the land portions 3, 3 in the tire width direction outer side that are partitioned by the outermost circumferential main grooves 2, 2 on the left and right sides are referred to as shoulder land portions.

[Belt Layer]

Figure 2:
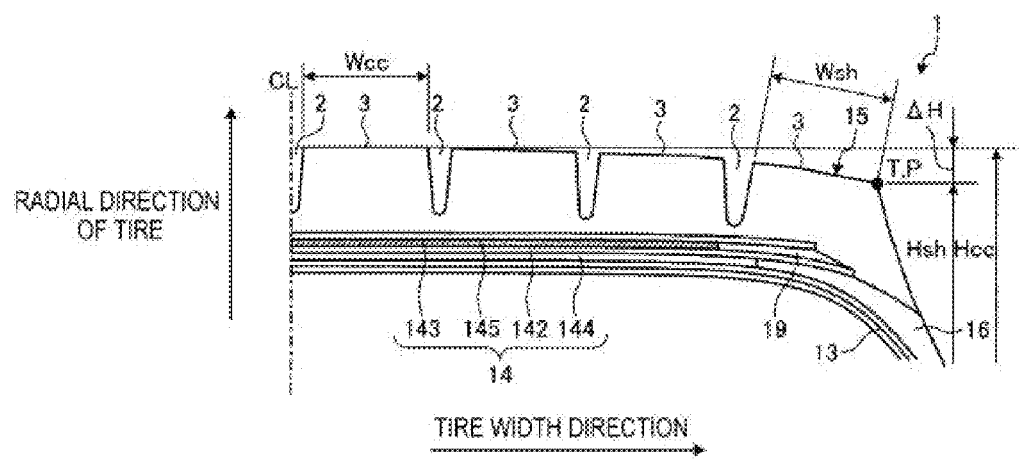
FIG. 2 is an explanatory view illustrating a belt layer of the pneumatic tire depicted in FIG. 1.
Figure 3:
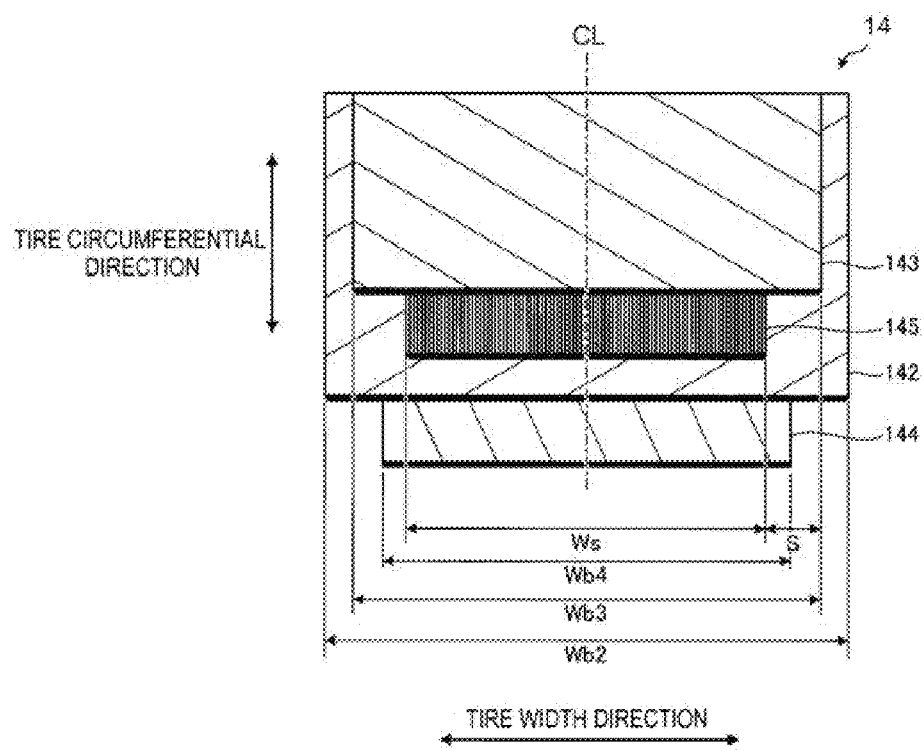
FIG. 3 is an explanatory view illustrating a belt layer of the pneumatic tire depicted in FIG. 1.

FIGS. 2 and 3 are explanatory views illustrating a belt layer of the pneumatic tire depicted in FIG. 1. Among these drawings, FIG. 2 illustrates an area on one side of a tread portion demarcated by the tire equatorial plane CL, and FIG. 3 illustrates a laminated structure of the belt layer 14. In FIG. 3, the fine lines in each of the belt plies 142 to 145 schematically represent the belt cords of each of the belt plies 142 to 145.

The belt layer 14 is formed by laminating a pair of cross belts 142, 143, a supplemental belt (low-angle belt) 144, and a circumferential reinforcing layer 145, wound around the periphery of the carcass layer 13 (see FIG. 2).

The pair of cross belts 142, 143 is configured by a plurality of belt cords formed from steel or organic fibers, covered with coating rubber, and subjected to a rolling process. Also, preferably, the pair of cross belts 142, 143 has a belt angle of not less than 46° and not more than 80° in absolute values (the angle of inclination of the fiber direction of the belt cords with respect to the tire circumferential direction), and more preferably have an angle of not less than 51° and not more than 70°. Additionally, the pair of cross belts 142, 143 have belt angles that are of mutually opposite signs to each other, and are laminated so that the fiber directions of the belt cords intersect each other (a crossply structure). In the following description, the cross belt 142 positioned on the inner side in the tire radial direction is referred to as "inner-side cross belt", and the cross belt 143 positioned on the outer side in the tire radial direction is referred to as "outer-side cross belt". Three or more cross belts may be disposed so as to be laminated (not shown).

Also, the supplemental belt 144 is configured from a plurality of belt cords made from steel or organic fibers covered with coating rubber, and subjected to a rolling process. Preferably, the supplemental belt 144 has a belt angle of not less than 10° and not more than 45° in absolute values, and more preferably has a belt angle of not less than 15° and not more than 30°. Furthermore, the supplemental belt 144 is disposed laminated on the inner side in the tire radial direction of the pair of cross belts 142, 143.

The circumferential reinforcing layer 145 is configured by belt cords formed from steel, and covered by coating rubber that are wound in a spiral manner with an inclination within a range of ±5° with respect to the tire circumferential direction. Specifically, the circumferential reinforcing layer 145 is formed by winding one or a plurality of wires in a spiral manner around the periphery of the inner-side cross belt 142. Additionally, the circumferential reinforcing layer 145 is disposed so as to be interposed between the pair of cross belts 142, 143. Moreover, the circumferential reinforcing layer 145 is disposed inward in the tire width direction of left and right edges of the pair of cross belts 142, 143. The stiffness in the tire circumferential direction is reinforced by the circumferential reinforcing layer 145.

In the pneumatic tire 1, the belt layer 14 may have an edge cover (not shown). Generally, the edge cover is configured by a plurality of belt cords formed from steel or organic fibers covered by coating rubber and subjected to a rolling process, having a belt angle, as an absolute value, of no less than 0° and no more than 5°. Additionally, edge covers are disposed outward in the tire radial direction of the left and right edges of the outer-side cross belt 143 (or the inner-side cross belt 142). As a result of the band effect of the edge cover, the difference in radial growth of a tread center region and a shoulder region is reduced.

Also, the supplemental belt 144 is disposed adjacent to the carcass layer 13 and the inner-side cross belt 142 (see FIGS. 2 and 3). Therefore, the supplemental belt 144 is configured as the layer on the innermost side in the tire radial direction of the belt layer 14, and, another belt ply is not disposed between the inner-side cross belt 142 and the carcass layer 13.

Also, the inner-side cross belt 142 and the outer-side cross belt 143 are each adjacent to the circumferential reinforcing layer 145 and sandwich the circumferential reinforcing layer 145. Therefore, another belt ply is not disposed between the inner-side cross belt 142, the outer-side cross belt 143, and the circumferential reinforcing layer 145.

[Specific Configuration of the Supplemental Belt]

Also, in the pneumatic tire 1, the supplemental belt 144 and the inner-side cross belt 142 that are adjacent to each other have belt angles with opposite signs (see FIG. 3). For example, in the configuration in FIG. 3, the inclination of the belt cords of the supplemental belt 144 is downward and to the right, and, the inclination of the belt cords of the inner-side cross belt 142 is down and to the left. Therefore, the belt cords of the supplemental belt 144 and the belt cords of the inner-side cross belt 142 are inclined in opposite directions, so that their belt angles have different signs.

Also, the supplemental belt 144 covers the disposal region of the outermost circumferential main grooves 2 (see FIG. 2). Specifically, the supplemental belt 144 is disposed over the whole region of the groove width of the outermost circumferential main grooves 2. In this way, the groove bottoms of the outermost circumferential main grooves 2 are reinforced. If the supplemental belt 144 has a split structure as described later (FIGS. 6 and 7), each divided portion 1441, 1441 of the supplemental belt 144 is disposed covering the disposal region of the outermost circumferential main grooves 2.

Also, the width Wb4 of the supplemental belt 144 and the width Wb2 of the inner-side cross belt 142 have the relationship $0.75 \leq Wb4/Wb2 \leq 0.95$ (see FIG. 3). Therefore, the supplemental belt 144 is narrower than the inner-side cross belt 142. Also, the ratio Wb4/Wb2 preferably has the relationship $0.80 \leq Wb4/Wb2 \leq 0.90$.

Also, the width Wb4 of the supplemental belt and the width Ws of the circumferential reinforcing layer 145 have the relationship $1.02 \leq Wb4/Ws$ (see FIG. 3). Therefore, the supplemental belt 144 is wider than the circumferential reinforcing layer 145. Also, preferably the supplemental belt 144 extends to the tire width direction outer side of the outermost circumferential main grooves 2 (see FIG. 2). Also, there is no particular upper limit to the ratio Wb4/Ws, but it is constrained by the relationship between the ratio Wb4/Wb3 and the ratio Ws/Wb3 which is described later.

The width of the belt plies is the distance in the tire rotational axis direction between the left and right ends of each of the belt plies, and measured when the tire is mounted on a regular rim and the regular inner pressure is applied under no load conditions.

Also, if a belt ply has a divided structure in the tire width direction (not shown), the width of the belt ply is measured as the distance between the tire width direction outer sides of the left and right divided portions.

Also, in a normal pneumatic tire 1, each belt ply has a left-right symmetric structure about the tire equatorial plane CL as center, as illustrated in FIG. 1. Therefore, the distance from the tire equatorial plane CL to the edge on the tire width direction outer side of a belt ply is half the width of the belt ply.

Herein, "standard rim" refers to an "applicable rim" defined by the Japan Automobile Tyre Manufacturers Association (JATMA), a "design rim" defined by the Tire and Rim Association (TRA), or a "measuring rim" defined by the European Tyre and Rim Technical Organisation (ETRTO). "Regular inner pressure" refers to "maximum air pressure" stipulated by JATMA, a maximum value in "tire load limits at various cold inflation pressures" defined by TRA, and "inflation pressures" stipulated by ETRTO. Note that "regular load" refers to "maximum load capacity" stipulated by JATMA, a maximum value in "tire load limits at various cold inflation pressures" defined by TRA, and "load capacity" stipulated by ETRTO. However, with JATMA, in the case of passenger car tires, the regular inner pressure is an air pressure of 180 kPa, and the regular load is 88% of the maximum load capacity.

Also, the belt cords of the supplemental belt 144 are steel wires, and, the number of ends is not less than 15/50 mm and not more than 25/50 mm.

[Improvement in Groove Cracking Resistance]

In recent years, heavy duty tires mounted on trucks and buses have a low aspect ratio and are provided with a circumferential reinforcing layer to maintain the shape of the tread portion. Specifically, the circumferential reinforcing layer is disposed in the center region of the tread portion, and maintains the shape of the tread portion by reducing radial growth of the tread portion by exhibiting a fastening effect.

In this configuration, the stiffness of the belt layer in the tire circumferential direction is increased by the circumferential reinforcing layer, so that the stiffness in the tire width direction is relatively reduced. As a result, the stiffness balance in the tire circumferential direction and the tire width direction is not uniform, which produces the problem that the tire groove cracking resistance is reduced. This problem is particularly significant under high internal pressure, high applied loads, and long term use conditions.

Regarding this point, in the pneumatic tire 1, the pair of cross belts 142, 143 function as a high angle belt, maintaining the stiffness in the tire width direction, as described above. Also, the circumferential reinforcing layer 145 and the supplemental belt 144 function as a low angle belt, maintaining the stiffness in the tire circumferential direction. In this way, the balance of stiffness in the tire circumferential direction and the tire width direction are appropriately adjusted, and the tire groove cracking resistance is improved.

[Round Shaped Shoulder Portions]

Figure 4:
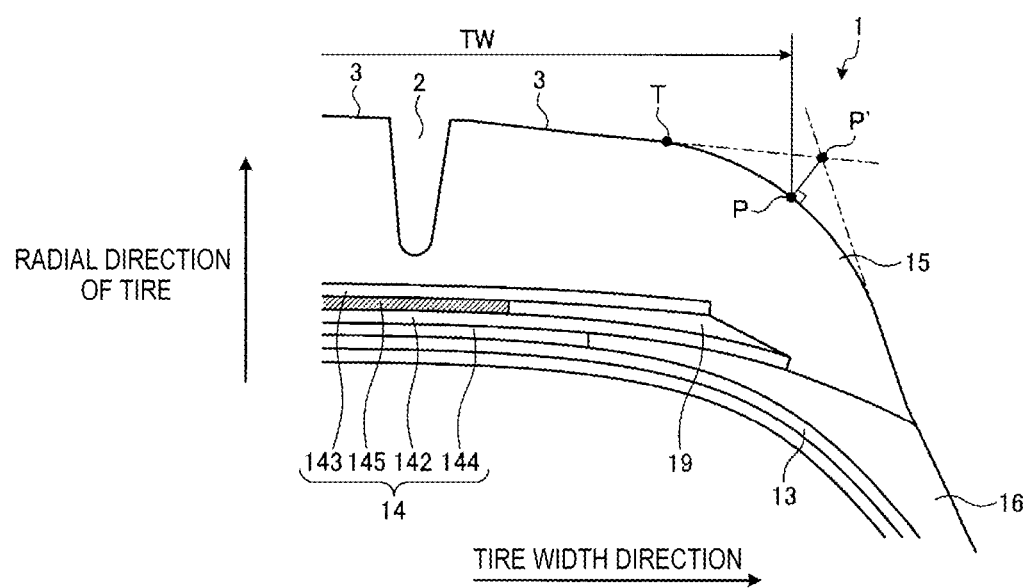
FIG. 4 is an explanatory view illustrating a modified example of the pneumatic tire depicted in FIG. 1.

FIG. 4 is an explanatory view of a modified example of the pneumatic tire depicted in FIG. 1. In this figure, a configuration having round shaped shoulder portions is depicted.

In the configuration of FIG. 1, the shoulder portions have a square shape as shown in FIG. 2, and the tire ground contact edge T coincides with the tread edge P. In other words, in the configuration having square shoulder portions, the points of the edge portions of the square shape are the tread edges P.

However, this is not a limitation, and the shoulder portions may have a round shape, as illustrated in FIG. 4. In this case, the intersection point of the tread portion profile and the side wall profile when viewed as a cross-section from the tire meridian direction is the point P', and the foot of the normal line drawn from the intersection point P' to the shoulder portion is the tread edge P, as described above. Therefore, normally, the tire ground contact edge T and the tread edge P are different positions.

[Additional Data]

Also, in FIG. 1, the tread width TW and the tire total width SW have the relationship $0.83 \leq TW/SW \leq 0.95$. Also, the ratio TW/SW is preferably in the range of $0.85 \leq TW/SW \leq 0.93$.

The total tire width SW refers to a linear distance (including all portions such as letters and patterns on the tire surface) between the side walls when the tire is assembled on a regular rim and filled to a regular inner pressure and is in an unloaded state.

The tread width TW is the distance in the tire rotational axis direction between the left and right tread edges P, P, and measured when the tire is mounted on a regular rim and the regular inner pressure is applied under no load conditions.

Also, the tread width TW and the cross-sectional width Wca of the carcass layer 13 have the relationship $0.82 \leq TW/Wca \leq 0.92$.

The cross-sectional width Wca of the carcass layer 13 refers to a linear distance between the left and right maximum width positions of the carcass layer 13 when the tire is assembled on a standard rim and filled to a regular inner pressure and is in an unloaded state.

Also, in FIG. 1, the diameter Ya at the maximum height position of the carcass layer 13 and the diameter Yc of the maximum width position of the carcass layer 13 has the relationship $0.80 \leq Yc/Ya \leq 0.90$. Also, the diameter Ya at the maximum height position of the carcass layer 13 and the diameter Yd of the carcass layer 13 at the end position of the circumferential reinforcing layer 145 has the relationship $0.95 \leq Yd/Ya \leq 1.02$. In this way, the cross-sectional shape of the carcass layer 13 is appropriately adjusted, and the contact pressure distribution of the tire is made uniform.

The diameter Ya of the highest position of the carcass layer 13 is measured as the distance from the tire rotational axis to the intersection of the tire equatorial plane CL and the carcass layer 13 when the tire is assembled on a standard rim and inflated to a regular inner pressure and is in an unloaded state.

The diameter Yc of the widest position of the carcass layer 13 is measured as the distance from the tire rotational axis to the widest position of the carcass layer 13 when the tire is assembled on a standard rim and inflated to a regular inner pressure and is in an unloaded state.

If the point of intersection of a straight line drawn from the edge of the circumferential reinforcing layer 145 in the tire radial direction and the carcass layer 13 is Q3 (not shown), then the diameter Yd of the carcass layer 13 at the end position of the circumferential reinforcing layer 145 is measured as the distance from the tire rotational axis to the point Q3, when tire is assembled on a standard rim and inflated to a regular inner pressure and is in an unloaded state.

Also, in FIG. 2, the outer diameter Hcc of the tread profile at the tire equatorial plane CL and the outer diameter Hsh of the tread profile at the tire ground contact edge T have a relationship $0.010 \leq (Hcc-Hsh)/Hcc \leq 0.015$ (see FIG. 2). As a result, a shoulder rounding amount $\Delta H$ (=Hcc−Hsh) in the shoulder region is made appropriate.

The outer diameters Hcc, Hsh of the tread profile are measured when the tire is assembled on a standard rim, inflated to a regular inner pressure, and no load is applied.

The "tire ground contact edge T" refers to the maximum width position in a tire axial direction of a contact surface between the tire and a flat plate in a configuration in which the tire is assembled on a regular rim, filled with regular inner pressure, placed perpendicularly to the flat plate in a static state, and loaded with a load corresponding to a regular load.

Also, in FIG. 1, the actual tire ground contact width Wg (not shown) and the total tire width SW have the relationship $0.60 \leq Wg/SW \leq 0.80$. As a result, the ratio Wg/SW of the tire actual ground contact width Wg and the total tire width SW is made appropriate.

The actual tire ground contact width Wg is calculated by subtracting the groove width of all the circumferential main grooves 2 from the overall tire ground contact width.

The ground contact width is measured as the sum total of the distances along the tread surface of each land portion, when the tire is mounted on a regular rim and the regular inner pressure is applied.

Also, the ground contact width Wsh of the shoulder land portion 3 and the tread width TW have the relationship $0.1 \leq Wsh/TW \leq 0.2$ (see FIGS. 1 and 2). In this way, the ground contact width Wsh of the shoulder land portion 3 is appropriately adjusted.

Also, the ground contact width Wcc of the land portion 3 closest to the tire equatorial plane CL and the ground contact width Wsh of the land portion 3 on the outermost side in the tire width direction have the relationship $0.80 \leq Wsh/Wcc \leq 1.30$ (see FIG. 2). Also, preferably, the ratio Wsh/Wcc is in the range of $0.9 \leq Wsh/Wcc \leq 1.20$.

In the case where there is a land portion 3 on the tire equatorial plane CL, the land portion 3 closest to the tire equatorial plane CL is that land portion 3, and in the case where a circumferential main groove 2 is on the tire equatorial plane, the land portion 3 is the land portion 3 from among the left and right land portions 3, 3 partitioned by the circumferential main groove 2 on the same side as the shoulder land portion 3 that is the subject of comparison. For example, in a configuration (not shown) having a tread pattern that is not symmetric left to right, if there is a circumferential main groove 2 on the tire equatorial plane CL, in a region bounded on one side by the tire equatorial plane CL, the ratio Wsh/Wcc of the ground contact width Wsh of the shoulder land portion 3 to the ground contact width Wcc of the land portion 3 closest to the tire equatorial plane CL is measured.

Also, in FIG. 3, preferably, the width Wb3 of the narrower cross belt (in FIG. 1, the outer-side cross belt 143) from among the inner-side cross belt 142 and the outer-side cross belt 143 and the width Ws of the circumferential reinforcing layer 145 have the relationship $0.70 \leq Ws/Wb3 \leq 0.90$. As a result, the width Ws of the circumferential direction reinforcing layer 145 can be properly secured.

The widths Wb2, Wb3 of the cross belts 142, 143 are measured as distances in the tire rotational axis direction of the left and right edges of each cross belt 142, 143 when the tire is assembled on a standard rim, inflated to a regular inner pressure, and no load is applied.

Also, in FIGS. 1 and 3, the width Wb2 of the wider cross belt (in FIG. 1, the inner-side cross belt 142) from among the inner-side cross belt 142 and the outer-side cross belt 143 and the cross-sectional width Wca of the carcass layer 13 have the relationship $0.73 \leq Wb2/Wca \leq 0.89$. Also, preferably, the ratio Wb2/Wca is within the range of $0.78 \leq Wb2/Wca \leq 0.83$.

Moreover, a width Ws of the circumferential reinforcing layer 145 and a cross-sectional width Wca of the carcass layer 13 have the relationship $0.60 \leq Ws/Wca \leq 0.70$.

In the pneumatic tire 1, as illustrated in FIG. 1, the width Ws of the circumferential reinforcing layer 145 preferably has the relationship $0.70 \leq Ws/TW \leq 0.90$ with respect to the tread width TW.

Also, as illustrated in FIG. 3, in the pneumatic tire 1, the circumferential reinforcing layer 145 is preferably disposed inward in the tire width direction from the left and right edges of the narrower cross belt (in FIG. 1, the outer-side cross belt 143) of the pair of cross belts (inner-side cross belt 142 and outer-side cross belt 143). Also, preferably, the width Wb3 of the narrower cross belt 143 and the distance S from the edge portion of the circumferential reinforcing layer 145 to the edge portion of the narrower cross belt 143 are in the range of $0.03 \leq S/Wb3 \leq 0.12$. As a result, the distance between the end portions of the width Wb3 of the cross belt 143 and the end portions of the circumferential reinforcing layer 145 is properly secured. This point is the same even if the circumferential reinforcing layer 145 has a divided structure (not shown).

The distance S of the circumferential reinforcing layer 145 is measured as a distance in the tire width direction when the tire is assembled on a standard rim, inflated to a regular inner pressure, and no load is applied.

Also, in the configuration illustrated in FIG. 1, the circumferential reinforcing layer 145 is constituted from a single steel wire that is wound spirally, as illustrated in FIG. 3. However, the configuration is not limited thereto, and the circumferential reinforcing layer 145 may also be configured by a plurality of wires wound spirally around side-by-side to each other (multiple winding structure). In this case, preferably, the number of wires is 5 or less. Additionally, the width of winding per unit when five wires are wound in multiple layers is preferably not more than 12 mm. As a result, a plurality of wires (not less than 2 and not more than 5 wires) can be wound properly at a slant within a range of ±5 degrees with respect to the tire circumferential direction.

Also, the belt cords of the pair of cross belts 142, 143 are steel wire, and the pair of cross belts 142, 143 preferably has not less than 18 ends/50 mm and not more than 28 ends/50 mm, and more preferably has not less than 20 ends/50 mm and not more than 25 ends/50 mm Also, the belt cords that constitute the circumferential reinforcing layer 145 are steel wire, and the circumferential reinforcing layer 145 preferably has not less than 17 ends/50 mm and not more than 30 ends/50 mm. As a result, the strengths of the belt plies 142, 143, 145 are properly secured.

Moreover, moduli E2, E3 at 100% elongation of the coating rubbers of the pair of cross belts 142, 143, and the modulus Es at 100% elongation of the coating rubber of the circumferential reinforcing layer 145 preferably have the relationship $0.90 \leq Es/E2 \leq 1.10$ and $0.90 \leq Es/E3 \leq 1.10$. Moreover, the modulus Es at 100% elongation of the coating rubber of the circumferential reinforcing layer 145 preferably is in the range of $4.5 \text{ MPa} \leq Es \leq 7.5 \text{ MPa}$. As a result, the moduli of the belt plies 142, 143, 145 are made appropriate.

The modulus at 100% elongation is measured in a tensile test at ambient temperature in conformance with JIS K6251 (using dumbbell No. 3).

Moreover, breaking elongations λ2, λ3 of the coating rubbers of the pair of cross belts 142, 143 are both preferably equal to or greater than 200%. Moreover, a breaking elongation λs of the coating rubber of the circumferential reinforcing layer 145 is preferably equal to or greater than 200%. As a result, the durability of the belt plies 142, 143, 145 is properly secured.

Breaking elongation is measured by performing a tensile test on a test sample of the JIS-K7162 specification 1B shape (dumb bell shape with a thickness of 3 mm) using a tensile tester (INSTRON5585H manufactured by Instron Corp.) conforming to JIS-K7161 at a pulling speed of 2 mm/min. Elongation is preferably not less than 1.0% and not more than 2.5% when the tensile load of the belt cords as components that configure the circumferential reinforcing layer 145 is from 100 N to 300 N, and is preferably not less than 0.5% and not more than 2.0% when the tensile load is from 500 N to 1000 N as a tire (when removed from the tire). The belt cords (high elongation steel wire) have a good elongation ratio when a low load is applied compared with normal steel wire, so they can withstand the loads that are applied to the circumferential reinforcing layer 145 during the time from manufacture until the tire is used, so it is possible to suppress damage to the circumferential reinforcing layer 145, which is desirable.

The elongation of the belt cord is measured in accordance with JIS G3510.

Also, in the pneumatic tire 1, preferably, the breaking elongation of the tread rubber 15 is in the range of not less than 400%, and more preferably not less than 450%. In this way the strength of the tread rubber 15 is ensured. There is no particular limitation on the upper limit of the breaking elongation of the tread rubber 15, but it is restricted by the type of rubber compound of the tread rubber 15.

Also, in the pneumatic tire 1, preferably, the hardness of the tread rubber 15 is in the range of not less than 60. In this way, the strength of the tread rubber 15 is appropriately ensured. There is no particular limitation on the upper limit of the hardness of the tread rubber 15, but it is restricted by the type of rubber compound of the tread rubber 15.

Here, "rubber hardness" refers to JIS-A hardness in accordance with JIS-K6263.

[Belt Edge Cushion Two-Color Structure]

Figure 5:
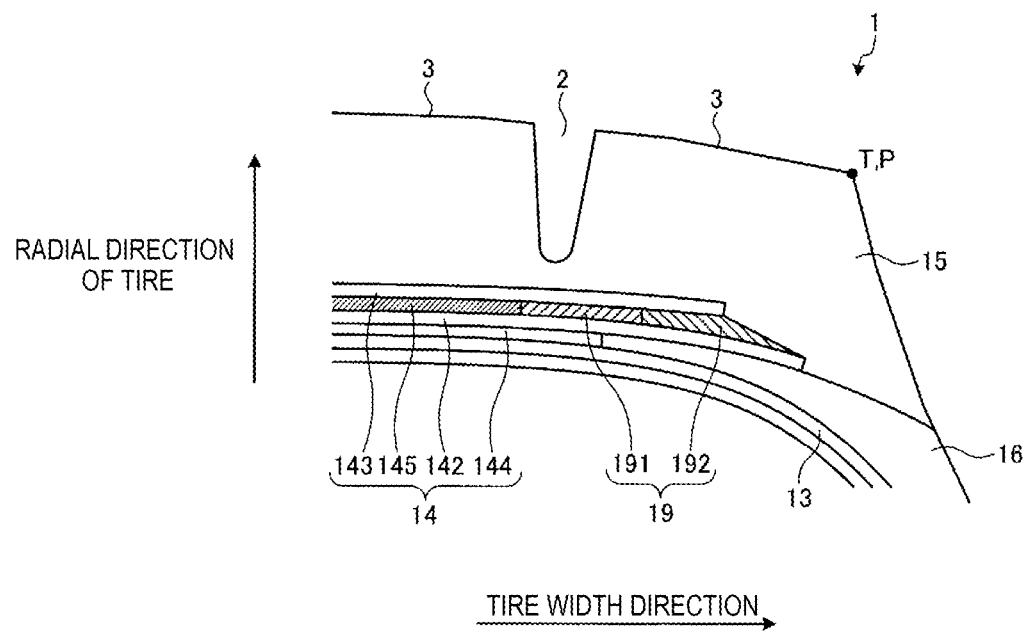
FIG. 5 is an explanatory view illustrating a modified example of the pneumatic tire depicted in FIG. 1.

FIG. 5 is an explanatory view of a modified example of the pneumatic tire depicted in FIG. 1. FIG. 5 is an enlarged view of an end portion of the belt layer 14 on the outer side in the tire width direction. In FIG. 5, the circumferential reinforcing layer 145 and the belt edge cushion 19 are indicated by hatching.

In the configuration illustrated in FIG. 1, the circumferential reinforcing layer 145 is disposed inward in the tire width direction of the left and right edges of the narrower cross belt 143 of the pair of cross belts 142, 143. The belt edge cushion 19 is disposed so as to be sandwiched between the pair of cross belts 142, 143 at a position corresponding to the edge portion of the pair of cross belts 142, 143. Specifically, the belt edge cushion 19 is disposed on the outer side of the circumferential reinforcing layer 145 in the tire width direction so as to be adjacent to the circumferential reinforcing layer 145, and extends from the end portion on the outer side of the circumferential reinforcing layer 145 in the tire width direction to the end portion on the outer side of the pair of cross belts 142, 143 in the tire width direction.

In the configuration illustrated in FIG. 1, the belt edge cushion 19 has a structure that is thicker as a whole than the circumferential reinforcing layer 145 due to the thickness increasing toward the outer side in the tire width direction. The belt edge cushion 19 has a modulus E at 100% elongation that is lower than the coating rubber of the cross belts 142, 143. Specifically, the modulus E at 100% elongation of the belt edge cushion 19 and a modulus Eco of the coating rubber have the relationship $0.60 \leq E/Eco \leq 0.95$. As a result, there is an advantage that the occurrence of separation of rubber materials between the pair of cross belts 142, 143 and in a region on the outer side in the tire width direction of the circumferential reinforcing layer 145 is suppressed.

Conversely, according to the configuration in FIG. 5, the belt edge cushion 19 in the configuration in FIG. 1 has a two-color structure composed of a stress relief rubber 191 and an edge portion relief rubber 192. The stress relief rubber 191 is disposed between the pair of cross belts 142, 143 on the outer side of the circumferential reinforcing layer 145 in the tire width direction so as to be adjacent to the circumferential reinforcing layer 145. The edge portion relief rubber 192 is disposed between the pair of cross belts 142, 143 on the outer side of the stress relief rubber 191 in the tire width direction at a position corresponding to the edge portion of the pair of cross belts 142, 143 so as to be adjacent to the stress relief rubber 191. Therefore, when viewed as a cross-section from the tire meridian direction, the belt edge cushion 19 has a structure composed by disposing the stress relief rubber 191 and the edge portion relief rubber 192 side to side in the tire width direction to fill a region from the end portion of the circumferential reinforcing layer 145 on the outer side in the tire width direction to the edge portion of the pair of cross belts 142, 143.

Also, in the configuration in FIG. 5, the modulus Ein at 100% elongation of stress relief rubber 191 and the modulus Es at 100% elongation of the coating rubber of the circumferential reinforcing layer 145 have the relationship Ein<Es. Specifically, preferably the modulus Ein at 100% elongation of stress relief rubber 191 and the modulus Es at 100% elongation of the coating rubber of the circumferential reinforcing layer 145 have the relationship $0.6 \leq Ein/Es \leq 0.9$.

Moreover, a modulus Ein at 100% elongation of the stress relief rubber 191 and the modulus Eco at 100% elongation of the coating rubber of the cross belts 142, 143 have a relationship of Ein<Eco in the configuration in FIG. 5. Specifically, the modulus Ein of the stress relief rubber 191 and the modulus Eco of the coating rubber preferably have the relationship $0.6 \leq Ein/Eco \leq 0.9$.

Also, in the configuration of FIG. 5, preferably, the modulus Eout at 100% elongation of edge stress relief rubber 192 and the modulus Ein at 100% elongation of the stress relief rubber 191 have the relationship Eout≤Ein.

Additionally, the modulus Ein at 100% elongation of the stress relief rubber 191 preferably is within the range of 4.0 MPa≤Ein≤5.5 MPa.

Since the stress relief rubber 191 is disposed on the outer side of the circumferential reinforcing layer 145 in the tire width direction in the configuration of FIG. 5, shearing strain of the periphery rubbers between the edge portion of the circumferential reinforcing layer 145 and the cross belts 142, 143 is alleviated. Moreover, since the end portion relief rubber 192 is disposed at a position corresponding to the edge portions of the cross belts 142, 143, shearing strain of the peripheral rubbers at the edge portions of the cross belts 142, 143 is alleviated. Accordingly, separation of the peripheral rubber of the circumferential reinforcing layer 145 is suppressed.

[Supplemental Belt Split Structure]

Figure 6:
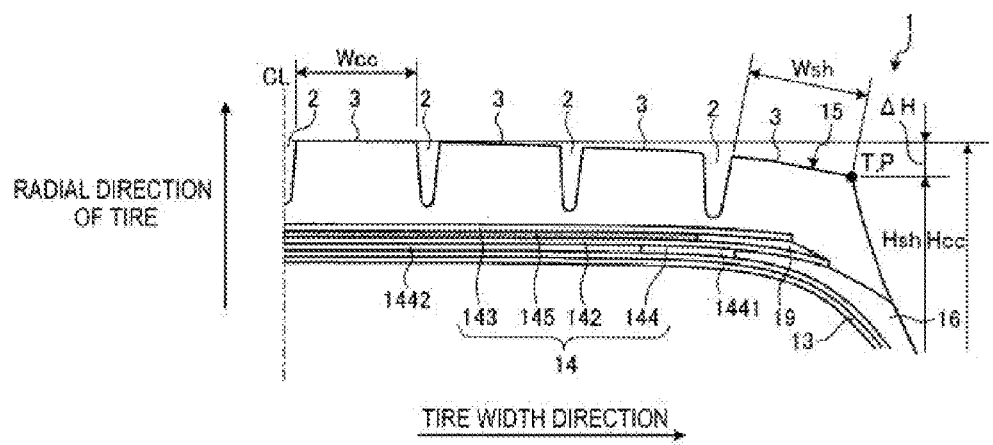
FIG. 6 is an explanatory view illustrating a modified example of the pneumatic tire depicted in FIG. 1.
Figure 7:
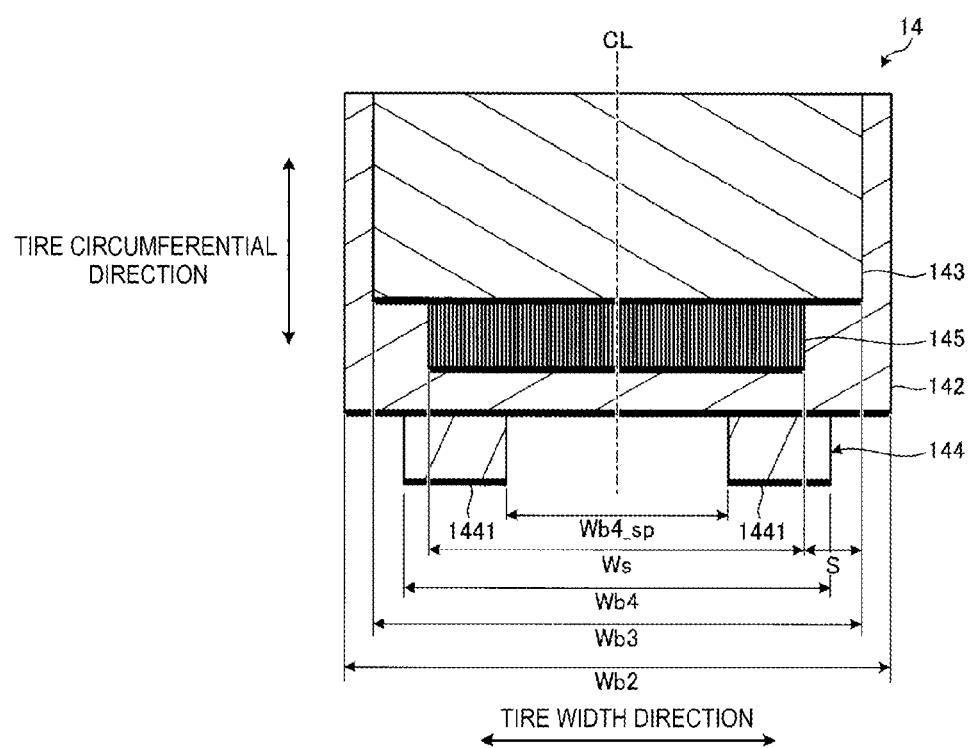
FIG. 7 is an explanatory view illustrating a modified example of the pneumatic tire depicted in FIG. 1.

FIGS. 6 and 7 are explanatory views illustrating modified examples of the pneumatic tire 1 depicted in FIG. 1. In these drawings, FIG. 6 illustrates a region on one side of the tread portion demarcated by the tire equatorial plane CL, and FIG. 7 illustrates the laminated structure of the belt layer 14.

In the configuration of FIG. 1, the supplemental belt 144 has a single structure, disposed with left-right symmetry with the tire equatorial plane CL as center, and the left and right ends extend to positions on the tire width direction outer side from the ends of the circumferential reinforcing layer 145.

However, this is not a limitation, and as illustrated in FIGS. 6 and 7, the supplemental belt 144 may have a split structure.

For example, in the configuration of FIG. 7, the supplemental belt 144 is configured from a pair of divided portions 1441, 1441, disposed in regions on the left and right of the tire respectively with the tire equatorial plane CL as center. Also, the left and right divided portions 1441, 1441 are disposed covering the left and right edges of the circumferential reinforcing layer 145. Therefore, the width Wb4 of the supplemental belt 144 is greater than the width Ws of the circumferential reinforcing layer 145.

Also, in the configuration as described above, preferably, the width Wb4_sp of the central gap portion of the split structure (the gap between the left and right divided portions 1441, 1441) and the width Ws of the circumferential reinforcing layer 145 have the relationship $0.40 \leq Wb4\_sp/Ws \leq 0.80$, and more preferably have the relationship $0.50 \leq Wb4\_sp/Ws \leq 0.70$.

Also, in the above configuration, the modulus E2 at 100% elongation of the coating rubber of the inner-side cross belt 142 and the modulus E4_sp at 100% elongation of rubber material 1442 disposed in the central gap portion of the split structure have the relationship $0.9 \leq E4\_sp \leq 1.1$. The rubber material 1442 is the rubber material disposed in the region surrounded by the left and right divided portions 1441, 1441 of the supplemental belt 144, the carcass layer (including the coating rubber), and the inner-side cross belt 142 (including the coating rubber), and in the green tire molding process, is disposed laminated with the periphery of the belt layer 14 and the carcass layer 13.

[Effect]

As described above, the pneumatic tire 1 includes the carcass layer 13, the belt layer 14 disposed on the outer side of the carcass layer 13 in the tire radial direction, and the tread rubber 15 disposed on the outer side of the belt layer 14 in the tire radial direction (see FIG. 1). The pneumatic tire 1 also includes the three circumferential main grooves 2 extending in the tire circumferential direction and the plurality of land portions 3 partitioned by the circumferential main grooves 2. Furthermore, the belt layer 14 includes the inner-side cross belt 142 and the outer-side cross belt 143 each having the absolute value of the belt angle with respect to the tire circumferential direction of not less than 46 degrees and not more than 80 degrees and having the belt angles with signs that are opposite to each other, the circumferential reinforcing layer 145 having the belt angle with respect to the tire circumferential direction in the range of ±5 degrees and disposed between the inner-side cross belt 142 and outer-side cross belt 143, and the supplemental belt 144 having the absolute value of the belt angle with respect to the tire circumferential direction of not less than 10 degrees and not more than 45 degrees and being disposed on the inner side in the tire radial direction of the inner-side cross belt 142 (see FIGS. 2 and 3). Moreover, the supplemental belt 144 and the inner-side cross belt 142 have belt angles with opposite signs.

In this configuration, the pair of cross belts 142, 143 function as a high angle belt, maintaining the stiffness in the tire width direction. Also, the circumferential reinforcing layer 145 and the supplemental belt 144 function as a low angle belt, maintaining the stiffness in the tire circumferential direction.

In this way, the balance of stiffness in the tire circumferential direction and the tire width direction is appropriately adjusted, which has the advantage that the tire groove cracking resistance is improved. Furthermore, the tire durability is maintained.

In particular, in the configuration as described above, the pair of cross belts 142, 143 functions as a high angle belt, so it is possible to eliminate other high angle belts (for example, belt plies having an absolute value of a belt angle of not less than 45 degrees and not more than 70 degrees, and disposed between the carcass layer and the inner-side cross belt). This has the advantage that the tire weight can be reduced.

Furthermore, in the configuration as described above, the pair of cross belts 142, 143 having belt angles that are greatly inclined with respect to the tire width direction, and the circumferential reinforcing layer 145 and the supplemental belt 144 having belt angles that are greatly inclined with respect to the tire circumferential direction are stacked alternately in the tire radial direction. Therefore, compared with, for example, a configuration (not shown) in which the circumferential reinforcing layer is disposed on the outer side in the tire radial direction or on the inner side in the tire radial direction of the pair of cross belts, the stiffness distribution in the tire radial direction between these belt plies 142, 143, 144, 145 is more uniform. As a result, there is an advantage that the tire belt durability is improved.

Moreover, in the configuration as described above, the supplemental belt 144 is disposed on the inner side in the tire radial direction of the pair of cross belts 142, 143. Therefore, compared with a configuration (not shown) in which the supplemental belt is disposed on the outer side in the tire radial direction of the pair of cross belts, the strain occurring in the groove bottoms due to the change in the angle of the cross belt is reduced, which has the advantage that the tire cracking resistance is improved.

Furthermore, in the configuration as described above, the supplemental belt 144 and the inner-side cross belt 142 which are adjacent to each other have the belt angles with opposite signs. Therefore, compared with a configuration (not shown) in which the supplemental belt and the outer-side cross belt have belt angles with the same sign, the fastening effect of the supplemental belt 144 and the inner-side cross belt 142 is greater. Therefore, the radial growth of the tire in the disposal region of the supplemental belt 144 is reduced, and the ground contact pressure in the tread portion center region and shoulder region is more uniform. This has the advantage that the tire groove cracking resistance is improved.

Also, in the pneumatic tire 1, the supplemental belt 144 is disposed adjacent to the carcass layer 13 and the inner-side cross belt 142 (see FIGS. 2 and 3). In this configuration, compared with, for example, a configuration having a high angle belt (an absolute value of a belt angle not less than 45 degrees and not more than 70 degrees) between the inner-side cross belt and the carcass layer, the tire circumferential stiffness is increased, and the balance of stiffness in the tire circumferential direction and the tire width direction is appropriately adjusted, which has the advantage that the tire groove cracking resistance is improved.

Furthermore, in the pneumatic tire 1, the supplemental belt 144 is disposed covering the disposal region of the outermost circumferential main grooves 2 (see FIG. 2). This has the advantage that the groove bottoms of the outermost circumferential main grooves 2 are reinforced. Specifically, by reinforcing the groove bottoms of the outermost circumferential main grooves 2 with the supplemental belt 144, the opening of the outermost circumferential main grooves 2 due to tire radial growth when the tire is inflated is reduced, and the occurrence of groove cracking is reduced.

Moreover, in the pneumatic tire 1, the width Wb4 of the supplemental belt 144 and the width Wb2 of the inner-side cross belt 142 have the relationship $0.75 \leq Wb4/Wb2 \leq 0.95$ (see FIG. 3). In this way the ratio Wb4/Wb2 is appropriately adjusted, which has the advantage that the balance of stiffnesses in the tire circumferential direction and the tire width direction is appropriately adjusted. In other words, by satisfying the relationship $0.75 \leq Wb4/Wb2$, the reinforcement effect of the stiffness in the tire circumferential direction is ensured by the supplemental belt 144, and on the other hand, by satisfying the relationship $Wb4/Wb2 \leq 0.95$, the stiffness in the tire circumferential direction is prevented from becoming excessive.

Furthermore, in the pneumatic tire 1, the belt cords of the supplemental belt 144 are steel wire, and have ends of not less than 15 ends/50 mm and not more than 25 ends/50 mm. This has the advantage that the stiffness in the tire circumferential direction of the supplemental belt 144 is appropriately maintained.

Moreover, in the pneumatic tire 1, the diameter Ya of the highest position and the diameter Yc of the widest position of the carcass layer 13 have the relationship $0.80 \leq Yc/Ya \leq 0.90$ (see FIG. 1). As a result, the cross-sectional shape of the carcass layer 13 is appropriately adjusted, which has the advantage that the contact pressure distribution of the tire is made uniform.

Furthermore, in the pneumatic tire 1, the diameter Ya at the maximum height position of the carcass layer 13 and the diameter Yd of the carcass layer 13 at the end position of the circumferential reinforcing layer 145 have the relationship $0.95 \leq Yd/Ya \leq 1.02$ (see FIG. 1). As a result, the cross-sectional shape of the carcass layer 13 is appropriately adjusted, which has the advantage that the contact pressure distribution of the tire is made uniform.

Moreover, in the pneumatic tire 1, the width Ws of the circumferential reinforcing layer 145 and the cross-sectional width Wca of the carcass layer 13 have the relationship $0.60 \leq Ws/Wca \leq 0.70$ (see FIG. 1). This has the advantage that the ratio Ws/Wca is appropriately adjusted. In other words, by satisfying the relationship $0.60 \leq Ws/Wc$, the width of the circumferential reinforcing layer 145 is ensured, rising of the tread portion near the edges of the circumferential reinforcing layer 145 (the region 1/4 of the tread width TW) is reduced, and the ground contact pressure of the shoulder land portions 3 is appropriately ensured. Furthermore, by satisfying the relationship $Ws/Wca \leq 0.70$, the difference in diameter between the center and the edges of the circumferential reinforcing layer 145 is relieved, the tension on the circumferential reinforcing layer 145 due to the repeated strain when the tire is rotating is reduced, and fatigue failure of the belt cords at the edges of the circumferential reinforcing layer 145 is reduced.

Moreover, in the pneumatic tire 1, the width Wb2 of the wider cross belt (in FIG. 1, the inner-side cross belt 142) out of the inner-side cross belt 142 and the outer-side cross belt 143 and the cross-sectional width Wca of the carcass layer 13 have the relationship $0.73 \leq Wb2/Wca \leq 0.89$. This has the advantage that the ratio Wb2/Wca is appropriately adjusted. In other words, by satisfying the relationship $0.73 \leq Wb2/Wca$, the width Wb2 of the wider cross belt is ensured, and the stiffness in the tire circumferential direction is ensured. Furthermore, by satisfying the relationship $Wb2/Wca \leq 0.89$, the stiffness in the tire circumferential direction is prevented from becoming excessive.

Furthermore, in the pneumatic tire 1, the breaking elongation of the tread rubber 15 is not less than 400%. As a result, there is the advantage that strength of the tread rubber 15 is secured.

Moreover, in the pneumatic tire 1, the supplemental belt 144 has a split structure (see FIGS. 6 and 7). In this way, there is the advantage that the difference in radial growth between the tread portion center region and shoulder regions can be effectively adjusted and made uniform. Furthermore, in the pneumatic tire 1, the width Wb4_sp of the central gap portion of the split structure and the width Ws of the circumferential reinforcing layer 145 have the relationship $0.40 \leq Wb4\_sp/Ws \leq 0.80$ (see FIG. 7). In this way, there is the advantage that the difference in radial growth between the tread portion center region and shoulder regions can be effectively adjusted and made uniform.

Moreover, in the pneumatic tire 1, the modulus E2 at 100% elongation of the coating rubber of the inner-side cross belt 142 and the modulus E4_sp at 100% elongation of the rubber material 1442 disposed in the central gap portion of the split structure have the relationship $0.9 \leq E4\_sp \leq 1.1$. In this configuration, the balance of stiffness in the tire circumferential direction and the tire width direction is appropriately adjusted, which has the advantage that the tire groove cracking resistance is improved.

Additionally, in the pneumatic tire 1, the tread width TW and the cross-sectional width Wca of the carcass layer 13 have the relationship $0.82 \leq TW/Wca \leq 0.92$ (see FIG. 1). In such a configuration, radial growth in the center region is suppressed due to the belt layer 14 having the circumferential reinforcing layer 145. Furthermore, a difference in radial growths between the center region and a shoulder region is alleviated and the ground contact pressure distribution in a tire width direction is made uniform due to the ratio TW/Wca being within the above range. As a result, there is the advantage that the tire ground contact pressure is made more uniform. That is, the air volume inside the tire is secured and deformation is suppressed due to the relationship TW/Wca being not less than 0.82. By making the relationship TW/Wca not less than 0.92, rising of the shoulder portion is reduced and the ground contact pressure distribution is made more uniform.

Also, in the pneumatic tire 1, the belt cords that constitute the circumferential reinforcing layer 145 are steel wire, and the circumferential reinforcing layer 145 has the ends of not less than 17 ends/50 mm and not more than 30 ends/50 mm. As a result, there is an advantage that the effect of suppressing radial growth in the center region is properly secured due to the circumferential reinforcing layer 145.

In the pneumatic tire 1, the elongation of the belt cords from which the circumferential reinforcing layer 145 is configured when they are components when subjected to a tensile load of 100 N to 300 N is preferably not less than 1.0% and not more than 2.5%. As a result, there is the advantage that the effect of reducing radial growth in the tread portion center region is properly ensured due to the circumferential reinforcing layer 145.

In the pneumatic tire 1, elongation is not less than 0.5% and not more than 2.0% when the tensile load of the belt cords as tire components that constitute the circumferential reinforcing layer 145 is from 500 N to 1000 N. As a result, there is an advantage that the effect of suppressing radial growth in the center region is properly secured due to the circumferential reinforcing layer 145.

Furthermore, in the pneumatic tire 1, the circumferential reinforcing layer 145 is disposed inward in the tire width direction from the left and right edges of the narrower cross belt (in FIG. 1, the outer-side cross belt 143) of the pair of cross belts (inner-side cross belt 142 and outer-side cross belt 143) (see FIG. 3). Moreover, the pneumatic tire 1 includes the stress relief rubber 191 disposed between the pair of cross belts 142, 143 and at a position on the outer side of the circumferential reinforcing layer 145 in the tire width direction and flanking the circumferential reinforcing layer 145, and the edge portion relief rubber 192 disposed between the pair of cross belts 142, 143 and at a position on the outer side of the stress relief rubber 191 in the tire width direction and corresponding to the edge portions of the pair of cross belts 142, 143 (see FIG. 5).

In such a configuration, there is an advantage that fatigue rupture of the periphery rubber at the edge portion of the circumferential reinforcing layer 145 is suppressed due to the circumferential reinforcing layer 145 being disposed on the inner side in the tire width direction from the left and right edge portions of the narrower cross belt 143 of the pair of cross belts 142, 143. Since the stress relief rubber 191 is disposed on the outer side of the circumferential reinforcing layer 145 in the tire width direction, shearing strain of the periphery rubber between the edge portion of the circumferential reinforcing layer 145 and the cross belts 142, 143 is alleviated. Moreover, since the end portion relief rubber 192 is disposed at a position corresponding to the edge portions of the cross belts 142, 143, shearing strain of the peripheral rubbers at the edge portions of the cross belts 142, 143 is alleviated. Accordingly, there is an advantage that separation of the periphery rubber of the circumferential reinforcing layer 145 is suppressed.

Furthermore, in the pneumatic tire 1, the modulus Ein at 100% elongation of the stress relief rubber 191 and the modulus Eco at 100% elongation of the coating rubber of the pair of cross belts (inner-side cross belt 142 and outer-side cross belt 143) have the relationship Ein<Eco (see FIG. 5). As a result, there is an advantage that the modulus Ein of the stress relief rubber 191 is made appropriate and the shearing strain of the periphery rubber between the edge portion of the circumferential reinforcing layer 145 and the cross belts 142, 143 is alleviated.

Moreover, in the pneumatic tire 1, the modulus Ein at 100% elongation of the stress relief rubber 191 and the modulus Eco at 100% elongation of the coating rubber of the pair of cross belts (inner-side cross belt 142 and outer-side cross belt 143) have the relationship $0.60 \leq Ein/Eco \leq 0.90$ (see FIG. 5). As a result, there is an advantage that the modulus Ein of the stress relief rubber 191 is made appropriate and the shearing strain of the periphery rubber between the edge portion of the circumferential reinforcing layer 145 and the cross belts 142, 143 is alleviated.

Additionally, in the pneumatic tire 1, the modulus Ein at 100% elongation of the stress relief rubber 191 is in range of $4.0 \text{ MPa} \leq Ein \leq 5.5 \text{ MPa}$ (see FIG. 5). As a result, there is an advantage that the modulus Ein of the stress relief rubber 191 is made appropriate and the shearing strain of the periphery rubber between the edge portion of the circumferential reinforcing layer 145 and the cross belts 142, 143 is alleviated.

Furthermore, in the pneumatic tire 1, the circumferential reinforcing layer 145 is disposed inward in the tire width direction from the left and right edges of the narrower cross belt (in FIG. 1, the outer-side cross belt 143) of the pair of cross belts (inner-side cross belt 142 and outer-side cross belt 143) (see FIG. 1). Moreover, preferably, the width Wb3 of the narrower cross belt 143 and the distance S from the edge portion of the circumferential reinforcing layer 145 to the edge portion of the narrower cross belt 143 are in the range of $0.03 \leq S/Wb3 \leq 0.12$ (see FIG. 3). In this way, there is the advantage in that the positional relationship S/Wb3 between the edges of the cross belts 142, 143 and the edges of the circumferential reinforcing layer 145 is appropriately adjusted. In other words, by satisfying the relationship $0.03 \leq S/Wb3$, the distance between the edge of the circumferential reinforcing layer 145 and the edge of the cross belt 143 is appropriately ensured, and separation of the rubber around the edges of these belt plies 145, 143 is reduced. Also, by satisfying the relationship $S/Wb3 \leq 0.12$, the width Ws of the circumferential reinforcing layer 145 with respect to the width Wb3 of the cross belt 143 is ensured, so that the fastening effect of the circumferential reinforcing layer 145 is appropriately ensured.

[Target of Application]

The pneumatic tire 1 is preferably applied to a heavy duty tire with an aspect ratio of not less than 40% and not more than 75% when assembled on a regular rim, inflated with the regular inner pressure and the regular load is applied. A heavy duty tire has a higher load under use than a passenger car tire. Thus, a radial difference occurs easily between the region where the circumferential reinforcing layer is disposed and the regions on the outer side of the circumferential reinforcing layer in the tire width direction. Moreover, a ground contact shape having an hourglass shape occurs easily in the tire having the above-mentioned low aspect ratio. Therefore, by applying the present technology to heavy duty tires, the action and effect of the circumferential reinforcing layer 145 can be significantly obtained.

EXAMPLES

FIGS. 8A to 10B are tables showing results of performance testing of pneumatic tires according to embodiments of the present technology.

Evaluations of groove cracking resistance of a plurality of mutually different pneumatic tires were conducted for in performance tests. In these evaluations, test tires with tire size 315/60R22.5 were assembled onto a rim of size 22.5"×9.00", and an air pressure of 900 kPa was applied to these tires.

Also, the test tires were fitted to the drive axle of a 4×2 tractor trailer test vehicle, and the vehicle was driven for 100,000 km on a normal paved road with a load of 34.81 kN applied to the test tires. Then, the number of cracks of length 3 mm or greater that occurred on the groove bottom of the outermost circumferential main grooves was measured. Evaluations were performed by indexing the measurement results, with the conventional example set as the standard score (100). In these evaluations, higher scores were preferable. In particular, when the evaluation was 105 or higher (+5 points or more than the standard value of 100), it was deemed that the tire was sufficiently superior to the conventional example, and when the evaluation was 110 or higher, it was deemed that the tire was significantly superior to the conventional example. The test tires 1 of Working Example 1 had the configuration illustrated in FIGS. 1 to 3. Also, the main dimensions were set to TW=275 mm and Wca=320 mm. The test tires of Working Examples 2 to 30 were modified examples of the test tire of Working Example 1.

In the Comparative Example test tire, in the configuration of FIGS. 1 to 3, the supplemental belt 144 was disposed on the outer side in the tire radial direction of the outer-side cross belt 143. Therefore, the supplemental belt 144 was not adjacent to the inner-side cross belt 142. Also, a high angle belt having a belt angle of 60 degrees was provided between the inner-side cross belt 142 and the carcass layer 13. Therefore, the belt layer 14 had a structure in which five belt plies were laminated. Also, the pair of cross belts 142, 143 had a belt angle towards the tire circumferential direction (45 degrees or less).

As shown in the test results, the test tires of Working Examples 1 to 30 had improved tire groove cracking resistance.

What is claimed is:

1. A pneumatic tire, comprising: a carcass layer; a belt layer disposed on an outer side in a tire radial direction of the carcass layer; tread rubber disposed on the outer side in the tire radial direction of the belt layer; at least three circumferential main grooves extending in a tire circumferential direction; and a plurality of land portions partitioned by the circumferential main grooves, the belt layer including an inner-side cross belt and an outer-side cross belt each having an absolute value of a belt angle with respect to the tire circumferential direction of not less than 46 degrees and not more than 80 degrees and having the belt angles with signs that are opposite to each other;

a circumferential reinforcing layer having a belt angle with respect to the tire circumferential direction in a range of ±5 degrees, and disposed between the inner-side cross belt and the outer-side cross belt;

a supplemental belt having an absolute value of a belt angle with respect to the tire circumferential direction of not less than 10 degrees and not more than 45 degrees, and disposed on an inner side in the tire radial direction of the inner-side cross belt;

the belt angles of the supplemental belt and the inner-side cross belt having signs that are opposite to each other; and a width Wb4 of the supplemental belt and a width Wb2 of the inner-side cross belt have a relationship $0.75 \leq Wb4/Wb2 \leq 0.95$.

2. The pneumatic tire according to claim 1, wherein the supplemental belt is disposed adjacent to the carcass layer and the inner-side cross belt.

3. The pneumatic tire according to claim 1, wherein the supplemental belt is disposed covering a disposal region of the outermost circumferential main grooves.

4. The pneumatic tire according to claim 1, wherein a width Wb4 of the supplemental belt and a width Wb2 of the inner-side cross belt have a relationship $0.75 \leq Wb4/Wb2 \leq 0.95$.

5. The pneumatic tire according to claim 1, wherein belt cords of the supplemental belt are steel wire, and have a number of ends of not less than 15 ends/50 mm and not more than 25 ends/50 mm.

6. The pneumatic tire according to claim 1, wherein a diameter Ya of a highest position of the carcass layer and a diameter Yc of a widest position of the carcass layer have a relationship $0.80 \leq Yc/Ya \leq 0.90$.

7. The pneumatic tire according to claim 1, wherein the diameter Ya of a highest position of the carcass layer and a diameter Yd of the carcass layer at an end position of the circumferential reinforcing layer have a relationship $0.95 \leq Yd/Ya \leq 1.02$.

8. The pneumatic tire according to claim 1, wherein a width Ws of the circumferential reinforcing layer and a cross-sectional width Wca of the carcass layer have a relationship $0.60 \leq Ws/Wca \leq 0.70$.

9. The pneumatic tire according to claim 1, wherein a width Wb2 of the wider cross belt out of the inner-side cross belt and the outer-side cross belt and the cross-sectional width Wca of the carcass layer have a relationship $0.73 \leq Wb2/Wca \leq 0.89$.

10. The pneumatic tire according to claim 1, wherein breaking elongation of the tread rubber is not less than 400%.

11. The pneumatic tire according to claim 1, wherein the supplemental belt has a split structure.

12. The pneumatic tire according to claim 1, wherein a width Wb4_sp of a central gap portion of the split structure and the width Ws of the circumferential reinforcing layer have a relationship $0.40 \leq Wb4\_sp/Ws \leq 0.80$.

13. The pneumatic tire according to claim 11, wherein a modulus E2 at 100% elongation of coating rubber of the inner-side cross belt and a modulus E4_sp at 100% elongation of the rubber material disposed in the central gap portion of the split structure have a relationship $0.9 \leq E4\_sp/E2 \leq 1.1$.

14. The pneumatic tire according to claim 1, wherein a tread width TW and the cross-sectional width Wca of the carcass layer have a relationship $0.82 \leq TW/Wca \leq 0.92$.

15. A pneumatic tire, comprising: a carcass layer; a belt layer disposed on an outer side in a tire radial direction of the carcass layer; tread rubber disposed on the outer side in the tire radial direction of the belt layer; at least three circumferential main grooves extending in a tire circumferential direction; and a plurality of land portions partitioned by the circumferential main grooves, the belt layer including an inner-side cross belt and an outer-side cross belt each having an absolute value of a belt angle with respect to the tire circumferential direction of not less than 46 degrees and not more than 80 degrees and having the belt angles with signs that are opposite to each other;

a circumferential reinforcing layer having a belt angle with respect to the tire circumferential direction in a range of ±5 degrees, and disposed between the inner-side cross belt and the outer-side cross belt;

a supplemental belt having an absolute value of a belt angle with respect to the tire circumferential direction of not less than 10 degrees and not more than 45 degrees, and disposed on an inner side in the tire radial direction of the inner-side cross belt;

the belt angles of the supplemental belt and the inner-side cross belt having signs that are opposite to each other; and a diameter Ya of a highest position of the carcass layer and a diameter Yc of a widest position of the carcass layer have a relationship $0.80 < Yc/Ya < 0.90$.

16. A pneumatic tire, comprising: a carcass layer; a belt layer disposed on an outer side in a tire radial direction of the carcass layer; tread rubber disposed on the outer side in the tire radial direction of the belt layer; at least three circumferential main grooves extending in a tire circumferential direction; and a plurality of land portions partitioned by the circumferential main grooves, the belt layer including an inner-side cross belt and an outer-side cross belt each having an absolute value of a belt angle with respect to the tire circumferential direction of not less than 46 degrees and not more than 80 degrees and having the belt angles with signs that are opposite to each other;

a circumferential reinforcing layer having a belt angle with respect to the tire circumferential direction in a range of ±5 degrees, and disposed between the inner-side cross belt and the outer-side cross belt;

a supplemental belt having an absolute value of a belt angle with respect to the tire circumferential direction of not less than 10 degrees and not more than 45 degrees, and disposed on an inner side in the tire radial direction of the inner-side cross belt;

the belt angles of the supplemental belt and the inner-side cross belt having signs that are opposite to each other; and a width Ws of the circumferential reinforcing layer and a cross-sectional width Wca of the carcass layer have a relationship $0.60<Ws/Wca<0.70$.

* * * * *